United States Patent [19]

Leatherman et al.

[11] Patent Number: 4,507,566
[45] Date of Patent: Mar. 26, 1985

[54] STARTER ASSEMBLY FOR GASOLINE ENGINES

[76] Inventors: Ralph W. Leatherman; Boyce Leatherman, both of 710 Sherrill Ave., Lincolnton, N.C. 28092

[21] Appl. No.: 498,405

[22] Filed: May 26, 1983

Related U.S. Application Data

[63] Continuation-in-part of Ser. No. 484,850, Apr. 14, 1983.

[51] Int. Cl.³ .............................................. A01D 35/26
[52] U.S. Cl. .................................. 290/38 R; 290/38 B; 290/38 D; 123/179 SE; 123/179 M; 74/8; 56/17.5; 56/16.7
[58] Field of Search ............... 290/38 T; 123/179 SE, 123/179 M; 56/16.7, 229; 74/384, 8

[56] References Cited

U.S. PATENT DOCUMENTS

| | | | |
|---|---|---|---|
| 1,497,443 | 6/1924 | Hodgkins | 74/8 X |
| 1,498,317 | 6/1924 | Brockway | 74/8 |
| 1,960,965 | 5/1934 | Chandler et al. | 74/8 X |
| 1,997,571 | 4/1935 | Billon | 74/8 |
| 2,020,732 | 11/1935 | Marsh | 74/8 |
| 2,059,624 | 11/1936 | Collins | 290/38 R |
| 2,910,873 | 11/1959 | Bossard et al. | 74/8 |
| 3,361,166 | 1/1968 | Farmer | 123/179 SE X |
| 3,500,085 | 3/1970 | Smith | 123/179 SE |
| 3,536,051 | 10/1970 | Hamman | 123/179 SE |
| 3,696,593 | 10/1972 | Thorud et al. | 123/179 SE X |

Primary Examiner—William M. Shoop
Assistant Examiner—Paul Shik Luen Ip
Attorney, Agent, or Firm—Clifton Ted Hunt

[57] ABSTRACT

A gasoline engine is equipped with an auxiliary driven wheel selectively engageable with a driving wheel on the shaft of an electric motor mounted for movement relative to the gasoline engine and operable from a remote point. A compact housing enables use of the invention on existing equipment, such as a lawnmower, or installation as original equipment at the time of manufacture.

9 Claims, 6 Drawing Figures

STARTER ASSEMBLY FOR GASOLINE ENGINES

CROSS REFERENCE TO RELATED APPLICATIONS

This application is a continuation-in-part of application Ser. No. 484,850 filed Apr. 14, 1983 and entitled APPARATUS FOR STARTING GASOLINE ENGINES.

BACKGROUND OF THE INVENTION

Small gasoline engines of the type conventionally used for lawnmowers are generally equipped with a starter mechanism comprising a pull-cord attached to a recoil mechanism and to the shaft of the engine. The engine is started by the operator adjusting the carburetor setting and pulling on the cord to impart rotation to the shaft of the engine until the engine starts. This sometimes requires repetitive pulling on the cord, which is well known to be a tiresome experience.

Electric starting motors for small gasoline engines of the type conventionally used on lawnmowers are well known. The prior art electric starting motors known to applicants require extensive gearing. Additionally, a clutch is frequently employed so the starter motor may be disengaged after the gasoline engine starts. See, for example, U.S. Pat. No. 2,831,352 issued Apr. 22, 1958 to William T. Elliott et al. and U.S. Pat. No. 2,897,677 issued Aug. 4, 1959 to Samuel R. Wood.

The use of battery powered direct current starting motors for gasoline engines on lawnmowers is expensive, requiring a battery, a generator and suitable electrical and mechanical connections to render the starting motor operative.

Prior uses of electric motors operated by the alternating current available at almost all households have not heretofore provided a widely accepted starter for the gasoline engines popularly used on lawnmowers. U.S. Pat. Nos. 2,731,006; 2,804,957; 2,816,535; 2,843,101; 3,394,598; 4,365,596; and 4,372,263 all describe the use of an electric drill motor powered by the alternating current available at the household to start a gasoline engine. The various mechanisms disclosed for adapting the power of an electric drill to start a gasoline engine are economical but they have not gained wide-spread popularity, probably because of the risk of injury to the user.

U.S. Pat. No. 2,996,927 issued Aug. 22, 1961 to George W. Rome and U.S. Pat. No. 3,051,155 issued Aug. 28, 1962 to Walter L. Mehl et al. exemplify free standing installations for the starting of gasoline engines on lawnmowers by temporary engagement with an electric motor.

U.S. Pat. No. 3,500,085 issued Mar. 10, 1970 to James W. Smith illustrates the use of alternating current and a rectifier to power a direct current starter motor. It is described as being connected to a drive assembly of any of the conventional types, which would include the usual fly-wheel and clutch. The complexity of such mechanisms requires that such prior art electric starting motors be manufactured and installed as part of the original equipment, at a considerable increase in cost to the consumer as compared with gasoline engines not equipped with electric starting motors but with the familiar pull-cord starting apparatus.

SUMMARY OF THE INVENTION

The electric starting motor of the present invention does not require any internal gearing or fly-wheel and the use of a battery and alternator is optional. According to the prefered form of the invention, the starter assembly is mounted on and in a housing which can be readily attached to an existing lawnmower equipped at the time of manufacture with a pull-cord starting mechanism. Alternatively, the starter assembly of the present invention can be installed as original equipment with the gasoline engine at the time of manufacture.

It is an object of the invention to provide an electric starter motor for gasoline engines wherein the starter motor is movable relative to the gasoline engine during the starting operation.

It is another object of the invention to provide an assembly of the type described wherein a driving member is attached to the shaft of the electric starting motor and a driven member is attached to the shaft of the gasoline engine.

It is a still further object of the invention to provide a mechanism of the type described wherein the driving member and driven member are manually engaged by the operator prior to actuation of the electric motor and wherein the driving member and driven member are manually disengaged by the operator after the gasoline engine starts.

DETAILED DESCRIPTION OF THE INVENTION

Figure 1:
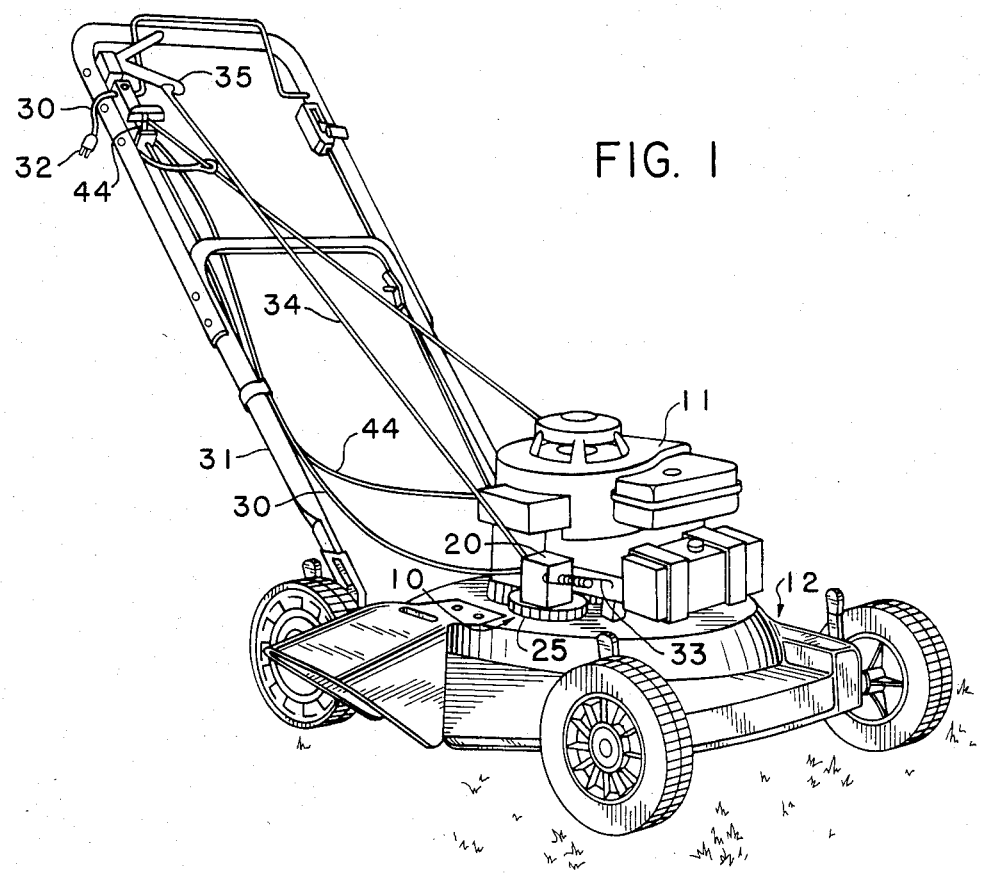
FIG. 1 is a perspective view of a lawnmower equipped with the starter assembly of the present invention.

Referring more specifically to the drawings, the numeral 10 broadly indicates a starter assembly for small gasoline engines, gnerally indicated at 11. The starter assembly 10 and the gasoline engine 11 are illustrated and described in connection with a lawnmower 12, although it is to be understood that the starter assembly may be used with a gasoline engine used for any purpose, such as a pump. The starter assembly 10 includes a housing comprising a base 13 with upturned marginal edges 14 and a cover 15 with downturned marginal edges 16 overlying the upturned marginal edges 14 of the base 13 and fastened thereto by bolts 17.

The base 13 and cover 15 of the housing are formed from a rigid material such as steel to support the gasoline engine 11 and an electric motor 20. The motor 20 is pivotally mounted as by a hinge 21 on a pivotal mounting bracket 19 fixed to an upstanding plate 22 rising from the cover 15 adjacent the gasoline engine 11. The cover 15 of the housing has an arcuate slot 23, through which extends the shaft 24 of the electric motor 20. A driving member or wheel 25 which may comprise a toothed wheel 26 (FIGS. 2, 3 and 6) or a smooth wheel 27 (FIG. 4) is fixed to the shaft 24 for movement therewith beneath the cover 15. An electric cord 30 extends from the motor 20 upwardly along the handle 31 of the lawnmower 12 to a switch 29 adjacent the top of the handle 31. A male plug 32 extends from the switch 29 and is located for easy connection to a source of alternating current electrical energy of the type commonly available in households.

A control rod 34 is fixed to the pivotal mounting bracket 19 at one end and to a bell crank 35 journaled on the handle 31 adjacent its upper end. Manipulation of the bell crank 35 moves the control rod 34 forwardly or rearwardly causing corresponding movement of the electric motor 20 on its pivotal mounting and corresponding movement of its shaft 24 through the slot 23 in the cover 15 of the housing.

Figure 2:
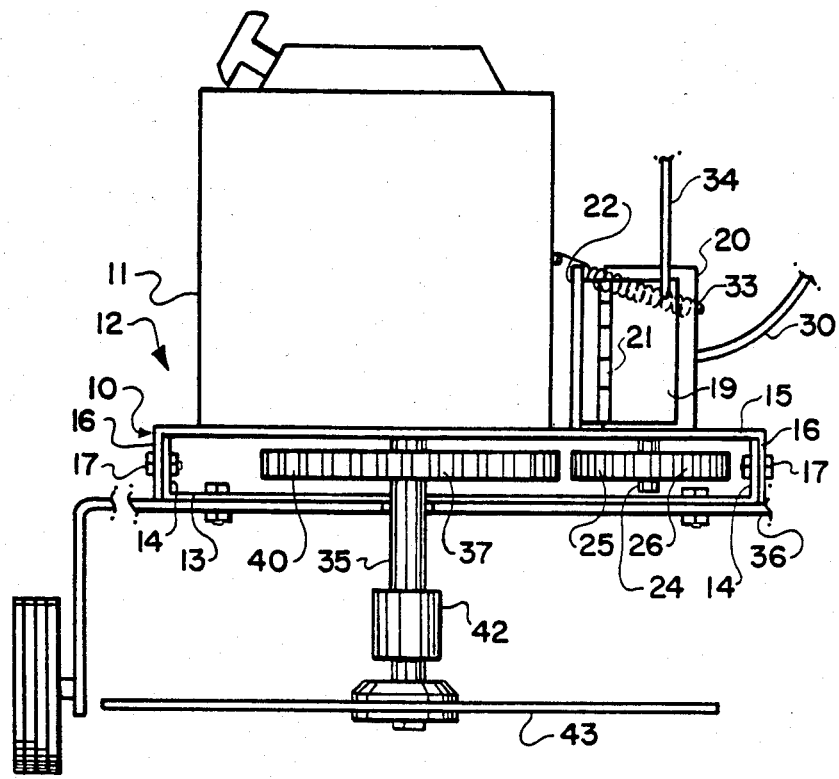
FIG. 2 is an enlarged fragmentary view, partially in section, with parts broken away, looking at the rear of the gasoline engine and illustrating a preferred embodiment of the starter assembly.

The gasoline engine 11 includes the usual drive shaft 20 which extends through the cover 15 and base 13 of the housing and through the deck 36 of the lawnmower 12 in FIG. 2. A driven wheel 37 which may be a toothed wheel 40 (FIGS. 2 and 3) or a smooth wheel 41 (FIG. 4) is fixed for rotation with the shaft 35 beneath the cover 15 in FIG. 2. The driven wheel 37 is preferably much larger in diameter than the driving wheel 25. In actual practice, a driving wheel about two inches in diameter and a driven wheel about eleven inches in diameter have been found to give satisfactory results. An adapter 42 is attached to the end of the drive shaft 35 to accomodate for the height of the housing and effectively lengthen the shaft 35 to its normal extent from the gasoline engine 11 on existing equipment. The usual cutting blade 43 is attached to the lower end of the adapter 42, and the usual manually operable carburetor control is shown at 44 in FIG. 1, extending upwardly along the handle 31.

Figure 4:
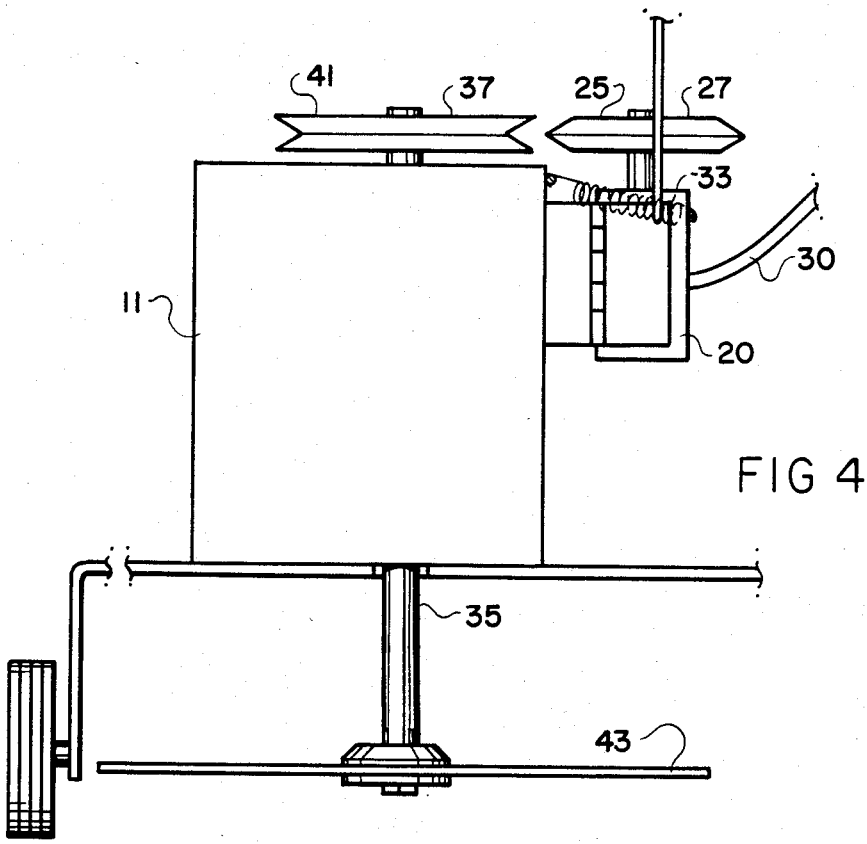
FIG. 4 is a view similar to FIG. 2 illustrating a third embodiment of the starter assembly.
Figure 5:
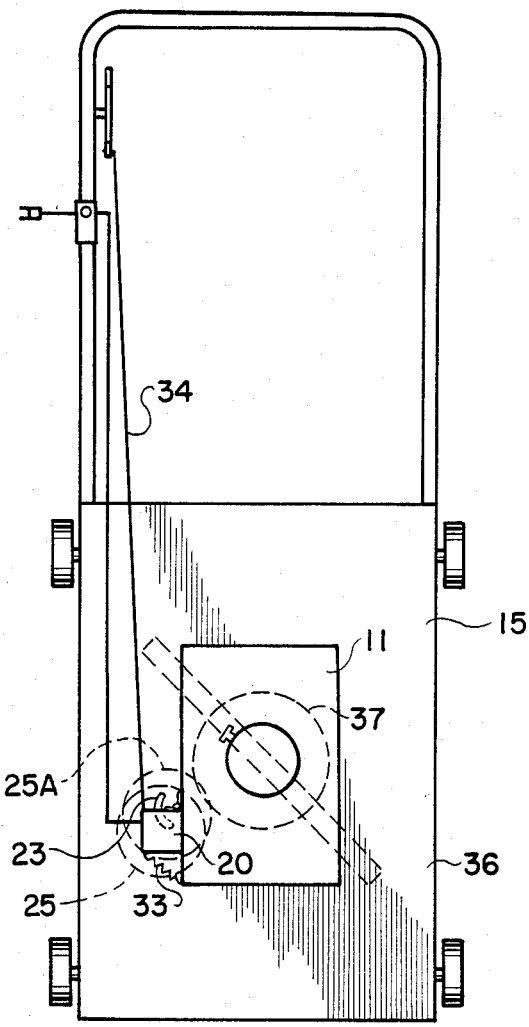
FIG. 5 is a plan view of the lawnmower schematically illustrating the engaged and disengaged position of the starter assembly.

In use, the carburetor control is adjusted by the operator to the starting position; the plug 32 is connected to a source of electric energy (AC or DC); the bell crank 35 is manipulated to move the electric motor 20 toward the gasoline engine 11 until its driving wheel 25 is moved from the position shown at 25 in FIG. 5 to the position shown at 25A in FIG. 5 so that it meshes with or firmly engages the driven wheel 37 on the gasoline engine 11. A spring 33 may be used to urge the driving wheel 25 into engagement with the driven wheel 37. Then, the switch 29 is activated to close the circuit to the electric motor 20 causing the driving wheel 25 to rotate, imparting rotation in the opposite direction to driven wheel 37 and the shaft 35 of gasoline engine 11. The shafts of most gasoline engines rotate in a clockwise direction so that in FIGS. 2, 3, 4 and 5 the driving wheel 25 is rotated in a counterclockwise direction.

The electric motor 20 is preferably a high torque motor capable of rotating at 10,000 rpm under full load. One such motor that has been successfully used with the starter assembly of the present invention is a universal type AC/DC motor manufactured by Dayton Electric Motor Co., Stock No. 2M145. Its high torque and speed almost instantly start the most stubborn gasoline engine, and its cost is less than half the cost of the electric starter and alternator used conventionally with small gasoline engines on lawnmowers, for example.

Figure 6:
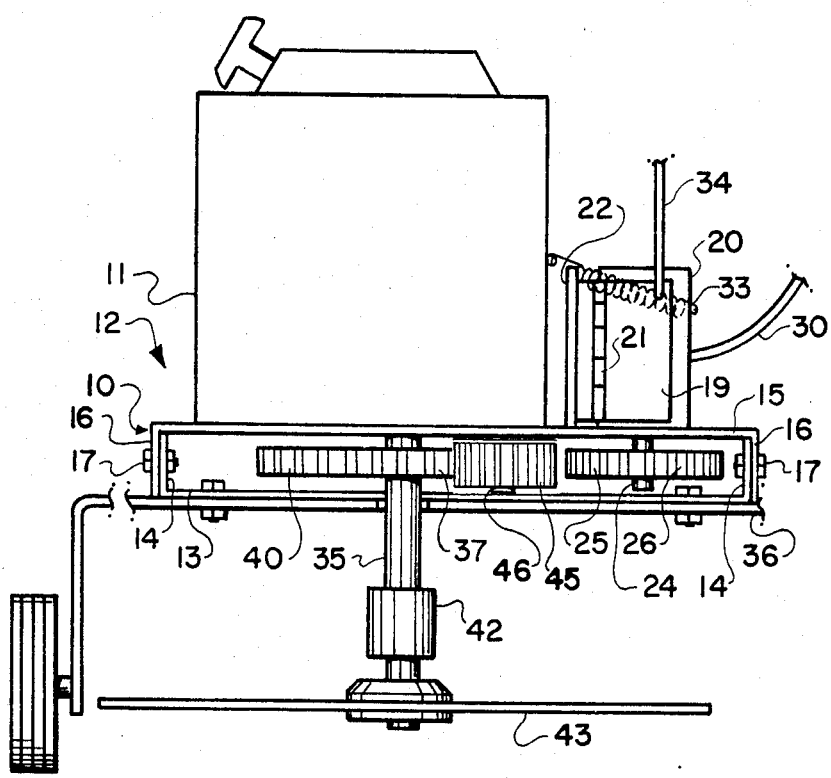
FIG. 6 is a view illustrating a fourth embodiment of the starter assembly.

Referring to FIG. 6, an idler pulley 45 is mounted on a stub shaft 46 rising from the base 13 of the housing and arranged in operative relation with the driven wheel 37 on the shaft 35 of the gasoline engine 11. In the embodiment of FIG. 6, the driving wheel 25 on the electric motor 20 is normally maintained in spaced relation to the idler wheel 45 and is moved into operative engagement with the idler wheel 45 only when it is desired to start the gasoline engine 11. The shaft 24 on the electric motor 20 and the shaft 35 on the gasoline engine 11 may rotate in the same direction in the embodiment of FIG. 6. This arrangement is advantageous because the shafts of electric motors and gasoline engines generally rotate in a clockwise direction.

The gasoline engine generally starts after a few rotations of its shaft 35, at which time the operator manipulates the bell crank 35 to move the electric motor 20 away from the gasoline engine and disengage the driving wheel 25 from the driven wheel 37 so that continued operation of the gasoline engine will not cause needless rotation of the shaft 24 and consequent deterioration of the electric motor 20.

The present invention is usable as original equipment on a lawnmower or other installation of a small gasoline engine and is equally useful as an accessory or modification kit for existing lawnmowers or other installations of gasoline engines. With reference to FIGS. 2 and 6, the kit comprises the housing with its base 13 and cover 15, the mounting bracket 22, the pivotal mounting plate 19, the electric motor 20, the driving wheel 25, the driven wheel 37, and, if desired, the idler wheel 45 and its shaft 46. The ancillary cord 30, switch 29, control rod 34, bell crank 35 and the adapter 42 are also part of the kit. These components may be engineered for convenient attachment to existing lawnmowers by removing the gasoline engine 11 from the deck 36 and fastening it to the top or cover 15 of the housing. The base 13 is fastened to the top of the deck in FIG. 2 and the ancillary components are attached and connected as indicated.

Figure 3:
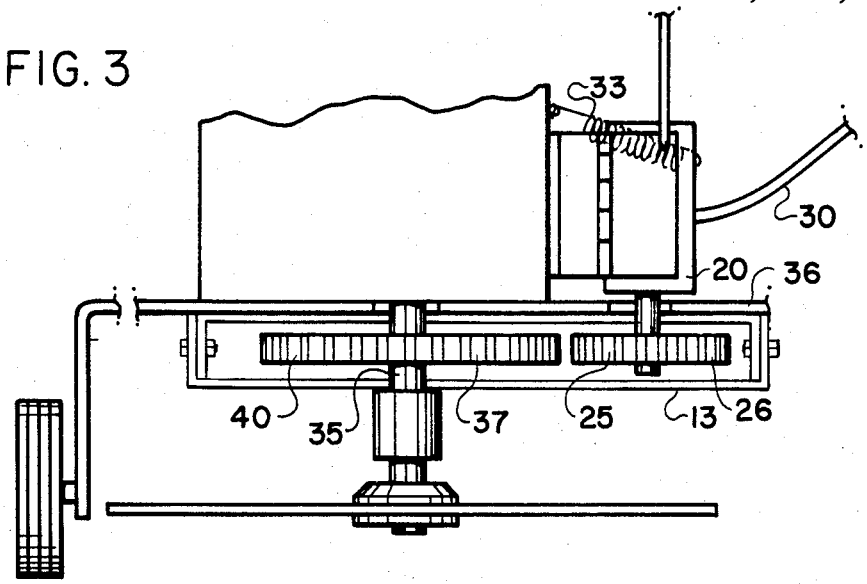
FIG. 3 is a view similar to FIG. 2 illustrating another embodiment of the starter assembly.

IN FIG. 3, the cover 15 is fastened to the undersurface of the deck 36 and the base 13 depends from the cover to enclose the driving wheel 25 and driven wheel 37 as shown.

In FIG. 4, the smooth driving wheel 27 and the smooth driven wheel 41 are preferably formed from synthetic rubber or other desired man-made material resistant to frictional wear but having a textured surface to reduce relative rotation.

The kit may embody any of these alternative arrangements, as desired.

In the drawings and specification there has been set forth a preferred embodiment of the invention and although specific terms are employed, they are used in a generic and descriptive sense only and not for purposes of limitation.

We claim:

1. In a kit, a starter assembly for a gasoline engine having a shaft, said assembly comprising
   (a) a driven wheel fixed to the shaft of the gasoline engine for rotation therewith,
   (b) an electric motor having a shaft,
   (c) a driving wheel fixed to the shaft of the electric motor for rotation therewith,
   (d) means for moving the electric motor and its driving wheel toward the gasoline engine and its driven wheel,
   (e) said driving wheel and driven wheel being arranged for operative engagement when the electric motor is moved sufficiently close to the gasoline engine, (f) means connecting the electric motor to a source of electric power after the driving and driven wheels are engaged to rotate said wheels and start the gasoline engine, (g) means for moving the electric motor and its driving wheel away from the gasoline engine after the gasoline engine has started, (h) means for disconnecting the electric motor from the source of electric power after the gasoline engine has started, (i) a housing containing said driving and driven wheels in normally spaced relation, (j) means for attaching the gasoline engine to the housing, (k) means for attaching the electric motor to the housing in pivotal relation to the gasoline engine, and (l) means for attaching the housing to an apparatus powered by the gasoline engine.

2. A structure according to claim 1 wherein said housing comprises a base with upstanding marginal edges, a cover with downturned marginal edges, and means for fastening together the marginal edges on the cover and the base.

3. A starter assembly for a gasoline engine having a shaft, said assembly comprising:

(a) a driven wheel fixed to the shaft of the gasoline engine for rotation therewith, (b) an electric motor having a shaft, (c) a driving wheel fixed to the shaft of the electric motor for rotation therewith, (d) means for moving the electric motor and its driving wheel toward the gasoline engine and its driven wheel, (e) said driving wheel and driven wheel being arranged for operative engagement when the electric motor is moved sufficiently close to the gasoline engine, (f) means for selectively connecting and disconnecting the electric motor to a source of electric power, (g) means for moving the electric motor and its driving wheel away from the gasoline engine after the gasoline engine has started, (h) a housing containing said driving and driven wheels in normally spaced relation, (i) means for attaching the gasoline engine to the housing, (j) means for attaching the electric motor to the housing in pivotal relation to the gasoline engine, and (k) means for attaching the housing to an apparatus powered by the gasoline engine.

4. An accessory for a lawnmower having a deck and a gasoline engine equipped with a shaft, said accessory comprising a starter assembly for selective attachment to the shaft of the gasoline engine and including a housing defined by a base and a cover with overlapping marginal edges, means for attaching the housing to the deck of the lawnmower, means for mounting the gasoline engine to the cover with the shaft extending through the housing and the deck, an electric motor having a shaft, means for attaching the electric motor to the cover with its shaft extending through the cover and in pivotal relation to the gasoline engine, a driving wheel on the shaft of the electric motor and within the housing, a driven wheel on the shaft of the gasoline engine and within the housing, means for manually engaging the driving and driven wheels, means for activating the electric motor to rotate said wheels, and means for manually disengaging said wheels after the gasoline engine starts.

5. Apparatus according to claim 4 wherein said means for manually engaging the driving and driven wheels and said means for manually disengaging said wheels after the gasoline engine starts comprise a single control rod extending from the electric motor to a point remote from said motor whereby an operator may start the gasoline engine from a point remote from the electric motor.

6. Apparatus according to claim 5 wherein said lawnmower includes a handle and wherein said control rod terminates adjacent the end of the handle remote from the lawnmower.

7. A starter assembly for a lawnmower having a deck and a gasoline engine equipped with a shaft, said starter assembly comprising a housing, means for attaching the housing to the deck of the lawnmower, means for mounting the gasoline engine to the housing with the shaft extending through the housing and the deck, an electric motor having a shaft, means for attaching the electric motor to the housing with its shaft extending into the housing and in pivotal relation to the gasoline engine, a driving wheel on the shaft of the electric motor and within the housing, a driven wheel on the shaft of the gasoline engine and within the housing, means for engaging the driving and driven wheels, means for activating the electric motor to rotate said wheels, and means for disengaging said wheels after the gasoline engine starts.

8. Apparatus according to claim 7 wherein said means for engaging the driving and driven wheels and said means for disengaging said wheels after the gasoline engine starts comprises a single control rod extending from the electric motor to a point remote from said motor, whereby an operator may start the gasoline engine from a point remote from the electric motor.

9. Apparatus according to claim 8 wherein said lawnmower includes a handle and wherein said control rod terminates adjacent the end of the handle remote from the lawnmower.

* * * * *